Dec. 8, 1959  J. D. WILKINSON ET AL  2,916,082
TRANSPORTATION SEAT SUPPORT
Filed Feb. 16, 1959
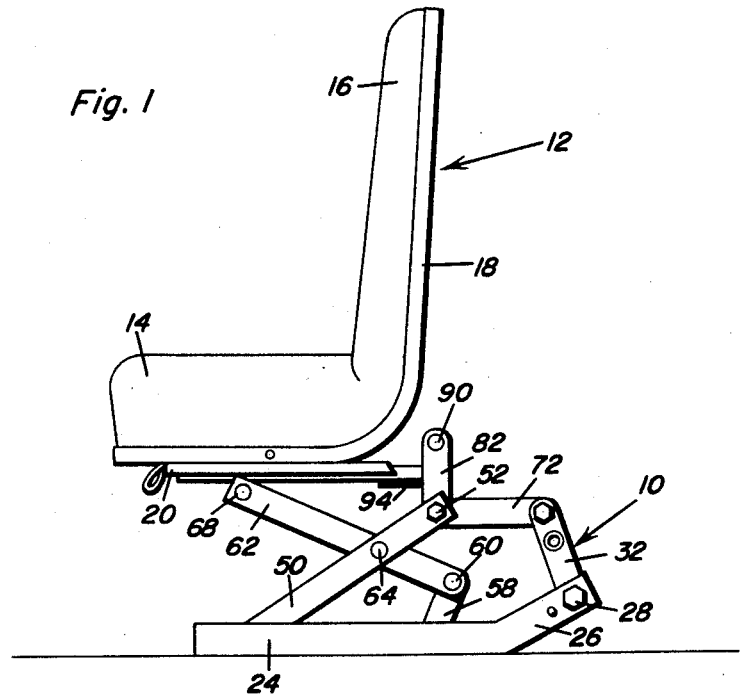
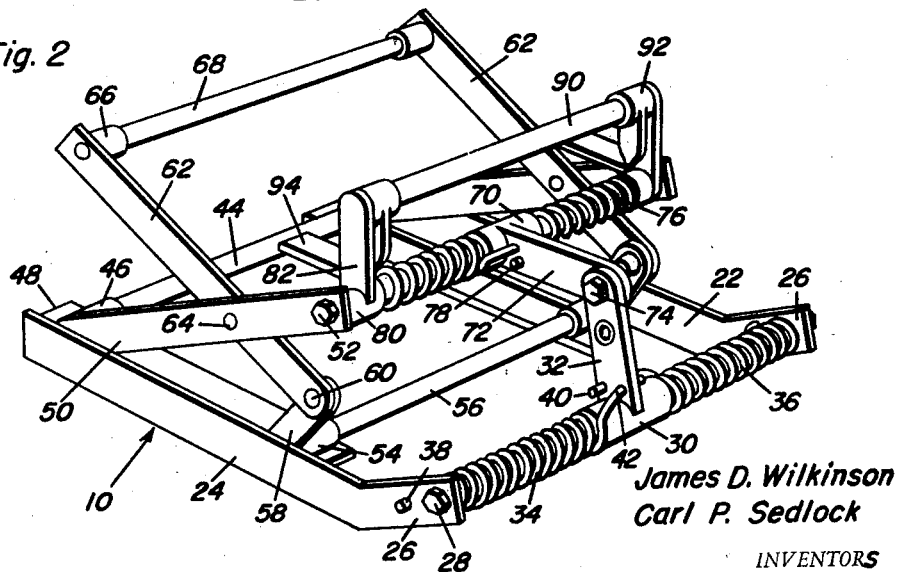
James D. Wilkinson
Carl P. Sedlock
INVENTORS

United States Patent Office 2,916,082
Patented Dec. 8, 1959

2,916,082

TRANSPORTATION SEAT SUPPORT

James D. Wilkinson and Carl P. Sedlock, Streator, Ill.

Application February 16, 1959, Serial No. 793,475

3 Claims. (Cl. 155—50)

The present invention generally relates to a seat supporting structure and more particularly to a truck or other transportation vehicle seat which incorporates the use of springs for absorbing shock thereby providing a smoother ride to the occupant of the seat and generally rendering the occupant more comfortable while occupying the seat.

The primary object of the present invention is to provide a truck seat support incorporating a toggle linkage and an axial spring arrangement which develops the greatest amount of tension just before it reaches the bottom of its downward stroke.

Another object of the present invention is to provide a truck seat supporting assembly incorporating a toggle linkage mechanism and axial springs which allows the supporting assembly to fold into a minimum space and offers a maximum stroke in a minimum required space or over-all height thereby providing a low clearance seat which is highly desirable in vehicle cab assemblies since the space therein is normally limited.

A further object of the present invention is to provide a truck seat supporting assembly which is simple in construction, easy to install, efficient in absorbing shock and generally inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout and in which:

Figure 1 is a side elevation of the truck seat supporting device of the present invention illustrating a truck seat mounted thereon; and Figure 2 is a perspective view of the supporting assembly.

Referring now particularly to the drawings, the numeral 10 generally designates the truck seat support of the present invention which is utilized for supporting the conventional truck seat generally designated by the numeral 12 which includes a seat portion 14 and a back rest 16 mounted on a suitable generally L-shaped frame 18 adjustably supported on a carriage 20 for fore and aft movement in a conventional manner with the carriage 20 being supported from the truck seat support 10 in a manner set forth hereinafter.

The struck seat support 10 includes a pair of longitudinally extending bottom frame rails 22 and 24 each of which has upwardly inclined rear end portions 26. Extending between the inclined rear ends 26 is an elongated rod 28 having a sleeve 30 journaled centrally thereon with the sleeve 30 having an arm 32 rigid therewith and extending upwardly therefrom. A pair of springs 34 and 36 are mounted on the rod 28 with the outer ends thereof projecting through apertures 38 whereby the spring 34 will be prevented from rotation about its longitudinal axis. The inner end of each of the springs 34 and 36 extends longitudinally with the inner ends being designated by the numeral 40 and extending through apertures 42 in the arm 32 thus providing actual springs for resiliently urging the arm 32 to a normal position.

A rod 44 extends between the ends of the frame rails 22 and 24 remote from the inclined end portions 26 and is journaled in bearings 46 carried by mounting plates 48. Each end of the rod 44 is provided with an elongated arm 50 which extends upwardly and rearwardly and the free ends of the arms 50 are interconnected by an elongated rod 52. Adjacent the other end of the mounting plate 48 there is provided bearing sleeves 54 which receive a transverse rod 56 having short arms 58 rigid with the outer ends thereof. The free ends of the shorter arms 58 are pivotally attached by pivot pins 60 to elongated arms 62 and the elongated arms 62 cross and are pivotally connected to the arm 50 by pivot pin 64. The free ends of the elongated arm 62 are provided with inwardly extending sleeves 66 loosely rotatable thereon and rotatably receiving a rod 68. The rod 68 is not rigidly attached to arm 62 and sleeve 66 is not rigid with arms 62 and will rotate on rod 68. The front of the sliding carriage under the seat is welded to sleeves 66 and the seat frame is bolted to the carriage.

The rod 52 is provided with a sleeve 70 having an extending arm 72 rigid therewith and the sleeve 70 is rotatable on the rod 52. The arm 72 is pivotally connected to the arm 32 by a pivot bolt 74. A pair of axial coil springs 76 are mounted on the rod 52 on opposite sides of the sleeve 70 and the springs 76 have longitudinally extending end portions 78 in engagement with the arm 72 by virtue of the inner ends extending through apertures provided therefor.

On each end of the rod 52 inwardly of the arms 50 is a sleeve 80. The other ends of the springs 76 are attached to the rod 52 by a sleeve having a lobe thereon. The sleeve 80 is provided with an offset arm 82 carrying a rod 90 having sleeves 92 mounted thereon with the sleeves 92 having L-shaped seat brackets 94 connected rigidly thereto with the seat brackets 94 forming a support for the rear end of the carriage 20 of the seat 12.

The pivotal connection such as the connection of the bolt 74 and the aperture in arm 32 may be provided with a ball bearing assembly pressed into it and packed in grease through which the pivot bolt is inserted thus reducing the friction in the device. Under weight or shock of bumps, the entire assembly will fold down and the springs 76 will absorb the shock thus giving a rider a smoother ride.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A truck seat support comprising a pair of longitudinally extending parallel frame rails, a pair of upwardly and rearwardly extending arms pivotally supported from the forward ends of said rails, a pair of short arms pivotally attached to the frame rails adjacent the rear ends thereof, a pair of elongated arms pivotally attached to the upper end of a pair of short arms and extending forwardly and upwardly in an inclined relation and crossing the pair of arms attached to the front ends of the frame rails, means pivotally interconnecting the cross arms, each of said frame rails having an upwardly and rearwardly extending rear end portion, a transverse rod interconnecting the ends of the upwardly inclined portion of the rails, a sleeve mounted on said rod, an offset arm connected to said sleeve, spring means interconnecting the rod and the arm for retaining the offset arm resiliently in predetermined angular position in relation to the rod, means on the forward end of the forward and upwardly inclined pair of arms for connection to a seat, means on the rear ends of the upwardly and rearwardly inclined pair of arms for supporting a seat, said last named means including a pair of brackets mounted for resilient swinging movement, a transverse rod interconnecting the free ends of the rearwardly and upwardly inclined arms and supporting said bracket, a sleeve on said last mentioned arm, an offset arm on said sleeve, means pivotally connecting the ends of the offset arms on the sleeves, and spring means interconnecting the sleeve and rod connecting the pair of arms extending upwardly and rearwardly for resiliently supporting a truck seat.

2. The structure as defined in claim 1 wherein said brackets are offset from said rod and each includes an L-shaped member having a horizontal leg extending under a portion of a truck seat.

3. The structure as defined in claim 1 wherein the pivotal connection between the offset arms is lubricated and provided with an anti-friction assembly.

References Cited in the file of this patent

UNITED STATES PATENTS

| | | |
|---|---|---|
| 1,769,434 | Jones | July 1, 1930 |
| 2,460,596 | Roche | Feb. 1, 1949 |
| 2,877,825 | Olson | Mar. 17, 1959 |